Aug. 27, 1935.  W. C. BROWN ET AL  2,012,806
LENS FOR VEHICLE HEAD LAMPS
Filed Feb. 24, 1933   2 Sheets-Sheet 1
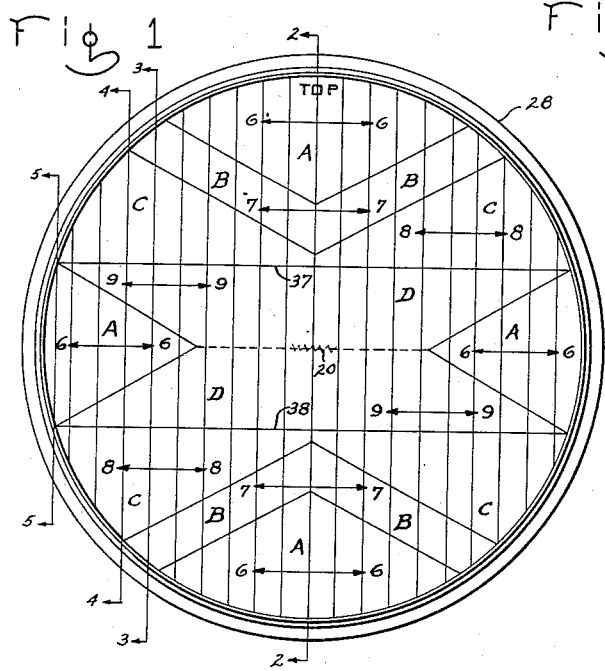
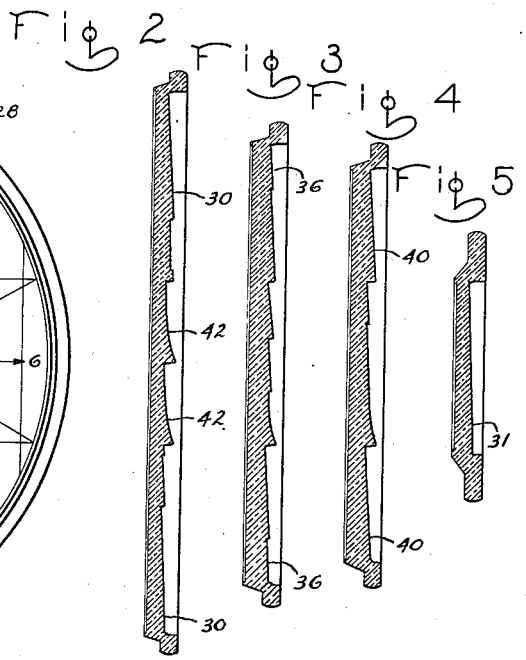
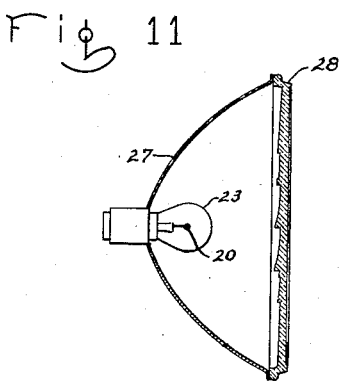
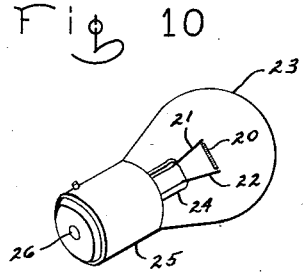
INVENTORS
WILLARD C. BROWN
VAL J. ROPER
FREDERICK F. DENNY
BY Charles E. Tullea
THEIR ATTORNEY Aug. 27, 1935.   W. C. BROWN ET AL   2,012,806
LENS FOR VEHICLE HEAD LAMPS
Filed Feb. 24, 1933   2 Sheets-Sheet 2
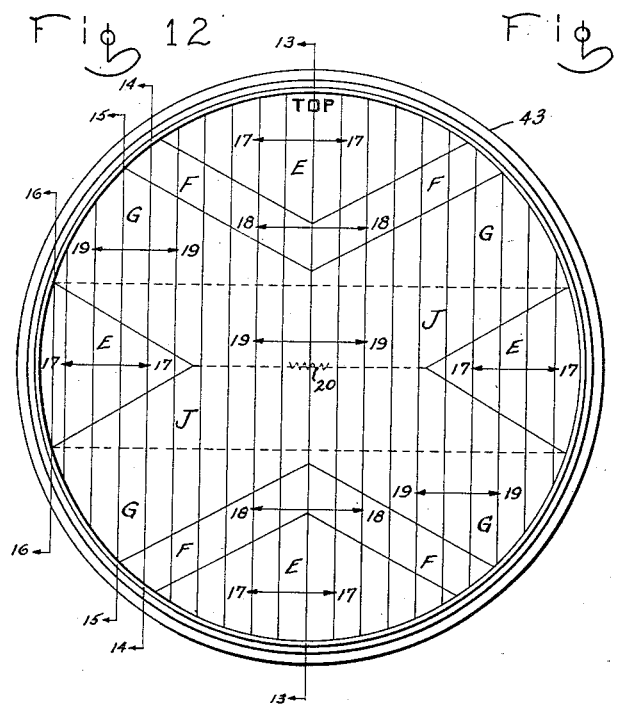
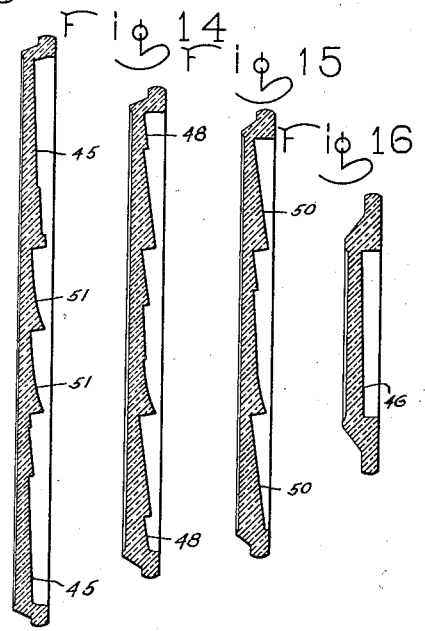
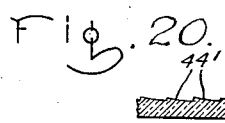
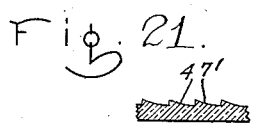
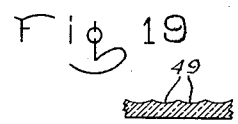
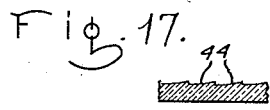
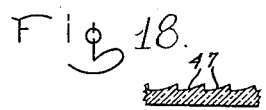
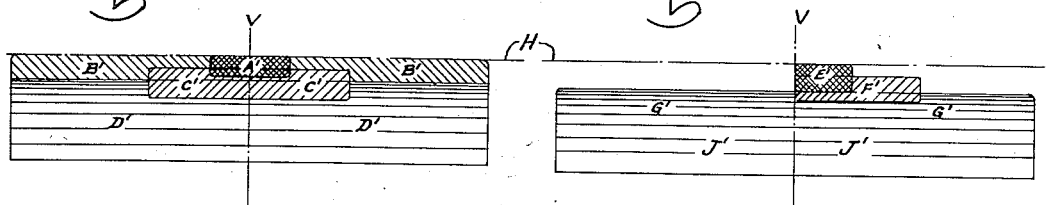
INVENTORS
WILLARD C. BROWN
VAL J. ROPER
FREDERICK F. DENNY
BY
THEIR ATTORNEY Patented Aug. 27, 1935

2,012,806

UNITED STATES PATENT OFFICE 2,012,806

LENS FOR VEHICLE HEAD LAMPS

Willard C. Brown, East Cleveland, Val J. Roper, Cleveland, and Frederick F. Denny, Cleveland Heights, Ohio, assignors to General Electric Company, a corporation of New York Application February 24, 1933, Serial No. 658,332

4 Claims. (Cl. 240—41.4)

Our invention relates to illumination and more particularly to vehicle headlights. Still more particularly our invention relates to light directing elements for vehicle headlights and to combinations of light directing elements and light sources.

The object of our invention is to provide forms of light directing elements and light source which represent the optimum combination from the standpoint of compactness of the complete unit and still retain that degree of control which will permit distribution of the light to best advantage on the road and above it.

With conventional headlamps of the present day, the zone of high candlepower of the beam, which is relatively narrow vertically, is produced from light reflected by side sections of the reflector which is of paraboloidal or modified paraboloidal contour. By this means a beam is obtained which is relatively insensitive to displacement of the source along the axis; and also, with a suitable lens or modification of the reflector surface, the device produces a downward tilt of the upper part of the beam when a switch is made from a light source disposed about the focus to one above focus, as disclosed in Patent No. 1,871,505, Falge and Brown. To reduce the size of the complete unit with this arrangement and retain the control of the distribution of light in the beam, one can reduce the diameter of the reflector, but this reduces the amount of light utilized by the reflector. To retain the efficiency it is necessary to increase the amount of light utilized. The only way of doing this and retaining the small size is to reduce the focal length of the reflector, and as this is done one increases the size of the images from various elements of the reflector. It is the size of the filament images from various sections of the reflector that regulates the control of distribution of light in the beam. With headlamps of present-day design and with lamp filaments of the size necessary to produce the requisite amount of light, when an attempt is made to reach small size and compactness, it is found that the amount of light in the beam is either decreased to such a great extent as to be relatively unsatisfactory, or, if the amount of light in the beam is maintained by decreasing the focal length of the reflector proportionally to its reduction in size, the character of the beam is destroyed and the high-intensity portion becomes too deep vertically for best utilization of a limited amount of light. The headlamp must also be such that it lends itself to suitable lateral distribution of light.

With our invention, we are able with a unit of smaller size to maintain the desirable amount and distribution of light in the beam. One of the features of our invention is the use of the top and bottom sections of the light directing element for the production of a high-intensity zone of small vertical spread or divergence. Another feature is the use of a light source, such as a helical filament, disposed horizontally and at right angles to the axis of the reflector. These make possible the high-intensity part of the beam that is narrow vertically, due to the fact that images of the horizontal helical filament are projected in a horizontal position from the said top and bottom sections of the light directing element. The conventional V-shaped headlight lamp filament would not be the optimum for this purpose, since with the apex pointing forward, the images as projected from the said top and bottom sections would be an upright V and an inverted V, respectively, thus making a light beam which is too deep vertically. Other features and advantages of our invention will appear from the following description of species thereof and from the drawings.

In the drawings, Fig. 1 is a front view of a lens forming part of our invention; Figs. 2 to 9 are sections along the lines 2—2 to 9—9 respectively of Fig. 1; Fig. 10 is a perspective view of an incandescent electric lamp; Fig. 11 is a section through a reflector, lens and lamp assembly; Fig. 12 is a front view of a modified lens for producing an asymmetric beam; Figs. 13 to 19 are sections along the lines 13—13 to 19—19 respectively of Fig. 12; Figs. 20 and 21 are modified sections along the lines 17—17 and 18—18 of Fig. 12; Fig. 22 is a diagrammatic representation of a beam pattern produced by the lens in Fig. 1; Fig. 23 is a diagrammatic representation of a beam pattern produced by the lens in Fig. 12.

Referring to Fig. 10, the preferred form of lamp used in our headlight comprises a helical filament 20 which is mounted on leading-in wires 21—22 in a bulb 23. The said leading-in wires 21—22 extend through a stem press 24 in which portions of said wires are sealed, one of said wires being connected to a base shell 25 and the other to a contact button 26. In Fig. 11, the said lamp is shown mounted in a parabolic reflector 27, the helical filament 20 being disposed horizontally therein. Instead of the conventional lamp 23 and reflector 27, it may be desirable to use the combination of a reflector having a lamp fixedly mounted therein such as disclosed in U. S. patent application Serial No. 629,010, Roper et al.

In Fig. 1 is shown a lens 28 comprising sector-shaped sections A at the top and bottom thereof which produce a beam of light of high intensity which is relatively narrow vertically. The upper central portion of the beam, such as A' in Fig. 22, is produced from these sections. The said sections A comprise spreading flutes 29 (Fig. 6) on the front surface thereof, and may or may not include slightly downward bending prisms 30 (Fig. 2) on the back surface. The beam of light shown in cross-section at A' (Fig. 22) produced thereby is disposed symmetrically about a vertical line V, which lies in the vertical plane passing through the middle of the lens 28, and when suitable downward bending prisms 30 are provided the top surface of said beam A' is located adjacent to a horizontal line H which lies in the horizontal plane passing through the middle of the lens 28. While the main portion of the light for area A' is projected from the top and bottom areas A, additional light therefor may be procured from sections A at each side. Said side sections A comprise spreading flutes 29 (Fig. 6) on their front surface and are with or without downward bending prisms 31 (Fig. 5) on the back surface.

The lens 28 also comprises sections B (Fig. 1) located adjacent to the top and bottom sections A. Said sections B comprise spreading flutes 35' (Fig. 7) on the front surface and, preferably, downward bending prisms 36 (Fig. 3) on the back surface. The light projected through said sections B comprises the portion B' (Fig. 22) of the beam pattern which extends across the full width thereof and has its upper edge adjacent to the horizontal line H. Upper and lower sections C (Fig. 1), which are adjacent to the sections B and are bounded by horizontal lines 37 and 38 above and below center respectively, comprise spreading flutes 39 (Fig. 8) on the front surface and downward bending prisms 40 (Fig. 4) on the back surface. The said sections C produce the beam shown in cross-section at C' (Fig. 22) which is of a width preferably intermediate between that of areas A' and B' and lies a short distance below the horizontal lines H. It may be desirable to start this section at H. Sections D (Fig. 1), which are located at the middle of the lens between lines 37—38 exclusive of the side sections A, comprise spreading flutes 41 (Fig. 9) on the front surface and downward bending prisms 42 (Fig. 2) on the back surface. The said sections D produce a beam of light shown in cross-section at D' (Fig. 22) which extends the full width of the beam and from the lower edge of area B to the bottom of the beam. It may be desirable to start the upper edge of this beam at the horizontal line H.

It will be apparent to those skilled in the art that some changes may be made in the design of the lens as shown without departing from the spirit of the invention, such as altering the shapes of the sections and placing the flutes on the back surface. Also, the light directing effect may be derived from a configurated reflector instead of from a lens.

We have illustrated in Fig. 12 a modified lens 43 which produces an asymmetric beam, as shown in Fig. 23. The said lens 43 is divided in sections E, F, G, J corresponding to sections A, B, C, D of the lens 28. The top and bottom sector-shaped sections E comprise narrow right spreading elements such as prisms 44 (Fig. 17) on the front surface and are with or without downward bending prisms 45 (Fig. 13) on the back surface. The said sections E produce a beam of light shown in cross-section at E' (Fig. 23), of high intensity having, when suitable downward bending prisms 45 are provided, its upper edge adjacent to the horizontal line H, the beam being located essentially to the right of the vertical line V and adjacent thereto. As in the lens 28, additional light for the area E' is derived from side sector-shaped sections E (Fig. 12) which comprise the right spreading elements 44 (Fig. 17) on the front surface and, preferably, downward bending prisms 46 (Fig. 16) on the back surface. Sections F comprise right spreading elements 47 (Fig. 18) on the front surface, and, preferably, downward bending prisms 48 (Fig. 14) on the back surface. The said sections F produce a beam of light shown in cross-section at F' (Fig. 23) which is wider than E' and has its upper edge a small distance below the horizontal line H and is located on the right side of the vertical line V and adjacent thereto. It may be desirable to start the top of this beam at the horizontal line H. The sections G and J comprise spreading flutes 49 (Fig. 19) on the front surface which produce beams of light shown in cross-section at G' and J' (Fig. 23) extending preferably the full width of the beam. The back surfaces of said areas G and J comprise downward bending prisms 50 (Fig. 15) and 51 (Fig. 13), respectively, prisms 51 having a greater bending action, so that the area of light G' is depressed below the horizontal line H and area J' is located below and adjacent to area G'. The pattern as indicated in Fig. 23 provides a very good passing beam by maintaining a beam of light of high intensity along the right side of the road away from the eyes of an approaching driver. It will be understood that the directing elements 44, 47 may be reversed so as to direct light to the left, thus causing the beams of light E', F' (Fig. 21) to be directed to the left of the line V. This is illustrated in Figs. 20 and 21 wherein the elements 44', 47' are the reverse of elements 44, 47 which they replace. It is then possible to use one of each of the right and left directing lenses to produce a composite beam.

What we claim as new and desire to secure by Letters Patent of the United States is:

1. In a vehicle headlight, light projecting means including a concave light-concentrating reflector and a glass closure, and a light source in said reflector extending horizontally in a straight line and transversely to the axis of said reflector, said light projecting means comprising sections extending entirely across the top and bottom only and sections located at each side only, the portion of the beam projected from said sections by said horizontal filament being of narrow vertical spread, and each of said sections having vertically extending elements of narrow light spread whereby a portion is produced at the top of the beam of higher intensity than the remainder of the beam and of comparatively narrow horizontal and vertical spread, the remainder of said light projecting means comprising vertically extending elements of wider light spread.

2. In a vehicle headlight, light projecting means including a concave light-concentrating reflector and a glass closure, and a light source in said reflector extending horizontally in a straight line and transversely to the axis of said reflector, said light projecting means comprising sections extending entirely across the top and bottom only and a second pair of sections located at each side only, the portion of the beam projected from said sections by said horizontal filament being of narrow vertical spread, and each of said sections having vertically extending elements of narrow light spread whereby a portion is produced at the top of the beam of higher intensity than the remainder of the beam and of comparatively narrow horizontal and vertical spread, a third pair of sections extending entirely across said light projecting means adjacent said top and bottom sections and comprising vertically extending elements of wider light spread, a fourth pair of sections extending entirely across said light projecting means adjacent said third pair of sections and comprising vertically extending elements of intermediate light spread, and a center section extending across said light projecting means between said side sections and comprising vertically extending elements of wide light spread.

3. In a vehicle headlight, light projecting means including a concave light-concentrating reflector and a glass closure, and a light source in said reflector extending horizontally in a straight line and transversely to the axis of said reflector, said light projecting means comprising sections extending entirely across the top and bottom only and a second pair of sections located at each side only, the portion of the beam projected from said sections by said horizontal filament being of narrow vertical spread, and each of said sections having vertically extending sidewise directing elements of narrow light spread whereby a portion is produced at the top and to one side of the beam of higher intensity than the remainder of the beam and of comparatively narrow horizontal and vertical spread, a third pair of sections extending entirely across said light projecting means adjacent said top and bottom sections and comprising vertically extending sidewise directing elements of intermediate light spread, a fourth pair of sections extending entirely across said light projecting means adjacent said third pair of sections and comprising vertically extending elements of wide light spread, and a center section extending across said light projecting means between said side sections and comprising vertically extending elements of wide light spread.

4. A light directing member for vehicle headlights comprising sections extending entirely across the top and bottom only and a second pair of sections located at each side only, each of said sections having vertically extending elements of narrow light spread, a third pair of sections extending entirely across said member adjacent said top and bottom sections and comprising vertically extending elements of wide spread, a fourth pair of sections extending entirely across said member adjacent said third pair of sections and comprising vertically extending elements of intermediate light spread, and a center section extending across said member between said side sections and comprising vertically extending elements of wide light spread.

WILLARD C. BROWN.
VAL J. ROPER.
FREDERICK F. DENNY.